July 31, 1962 W. R. SMITH 3,047,852
CHANGEABLE INDICATOR
Filed Dec. 15, 1958 2 Sheets-Sheet 1
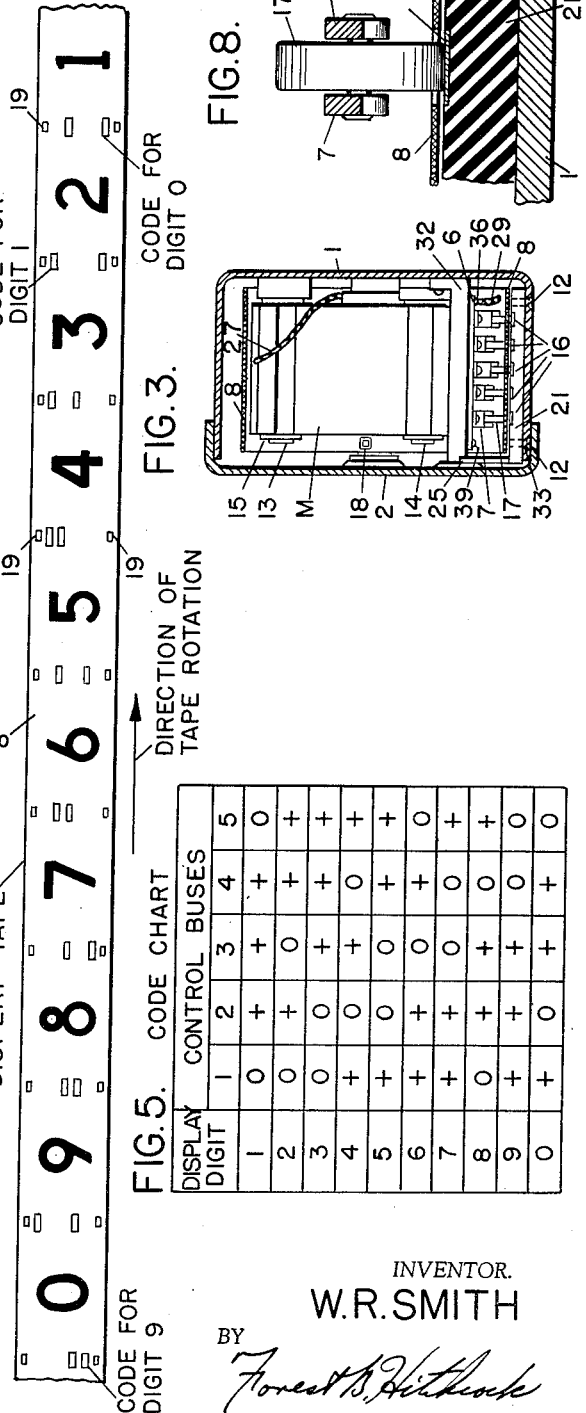
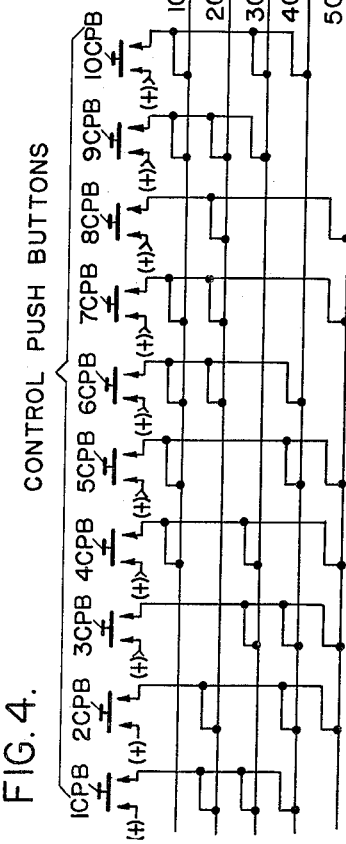
INVENTOR.
W.R. SMITH
BY
Forest B. Hitchcock
HIS ATTORNEY

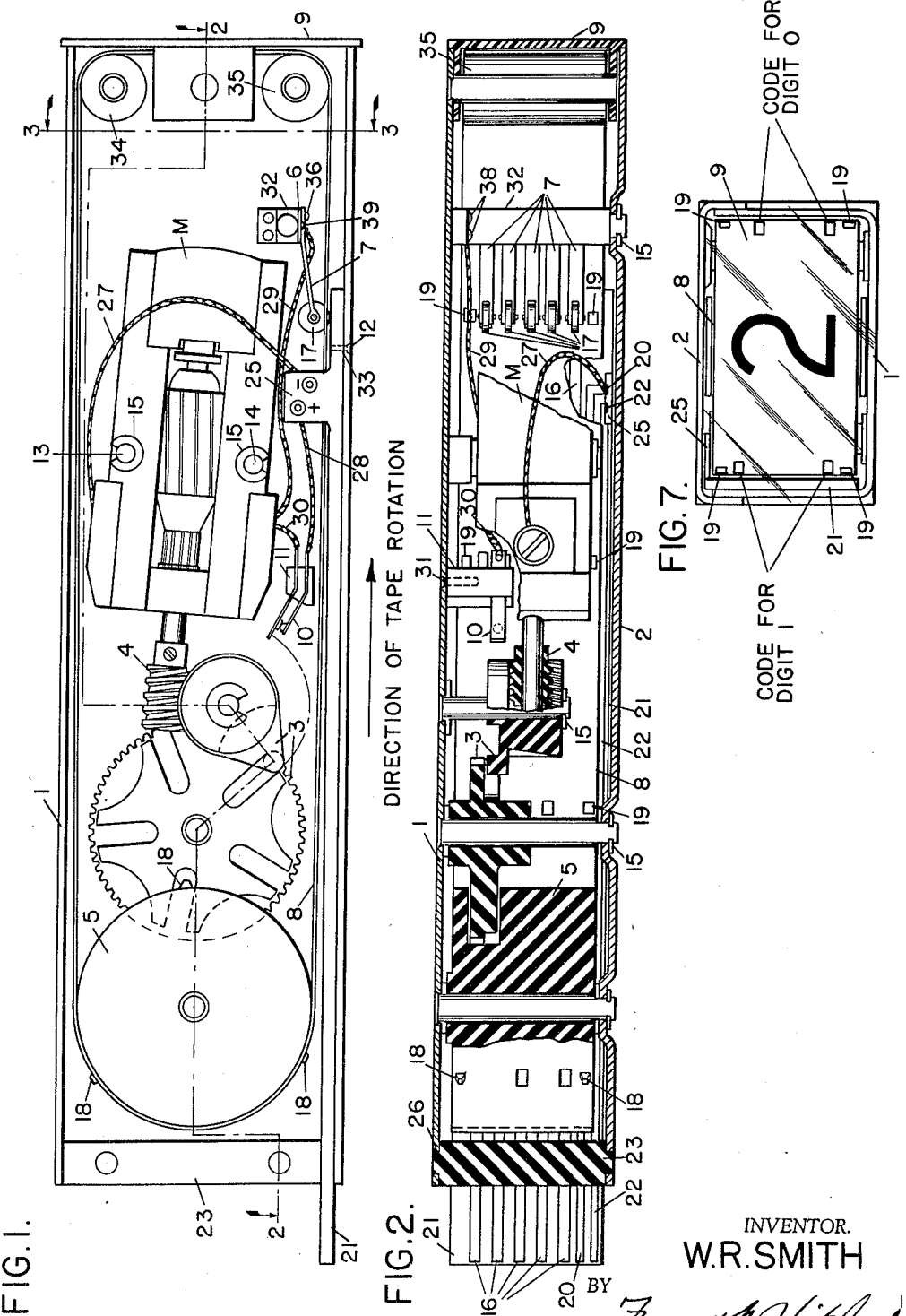

United States Patent Office 3,047,852
Patented July 31, 1962

3,047,852
CHANGEABLE INDICATOR
Willis R. Smith, Rochester, N.Y., assignor to General
Railway Signal Company, Rochester, N.Y.
Filed Dec. 15, 1958, Ser. No. 780,609
4 Claims. (Cl. 340—324)

This invention relates in general to airway traffic control systems, and more particularly to a changeable indicator for use in displaying diverse flight schedule data in connection with such airway traffic control systems.

In the systems employed for air traffic control, it is convenient to provide operating panels for displaying the items of information pertinent to differently scheduled flights in such a way that a controller may readily identify the various flights by their respective altitudes, their flight numbers, their type of plane, their fix or marker points, their times of arrival, and the like. The present invention relates to a changeable indicator which may be adapted to be used as an individual unit in contiguous positions to form such an operating panel, or other display panel. Such a composite organization of changeable indicators may be suitably controlled, such as in the pending patent application, Ser. No. 763,493 filed September 26, 1958 by N. B. Coley, to display the desired items of information. As shown in the above named patent application, each of the indicator units utilized are provided with five diodes individually and internally connected to one of the five control buses where a distinct combination of energy is applied to three of the five control buses so as to provide, among other advantages, individual selection and isolation of the indicator units. Although the present invention does not show these diodes in any form, it is conceivable that the present indicator unit could employ five diodes for such purposes in a similar manner either internal or external to the indicator unit. It is to be understood, of course, that the changeable indicator unit of the present invention may be used in various other types of panels and control systems where applicable.

One object of the present invention is to provide an indicator having a structure so disposed so as to require a minimum of space.

Another object of the present invention is to provide an indicator which has a minimum of movable parts but yet provides a durable and efficient structure.

Another object of the present invention is to provide a changeable indicator that may be readily inserted or withdrawn from its position in the operating panel so that substitute indicator units may be utilized when and if required.

Another object of the present invention is to enable provision of a substantial quantity of changeable indicators for different types of codes all having identical standard manufactured parts except for the display tapes.

Another object of the present invention is the provision of a display tape which may be perforated in accordance with one type of code selected from a number of different useable code types and which may be used with one changeable indicator adaptable to all the different code types.

Another object of the present invention is the provision of a changeable indicator having a simplified structure which is adaptable to a variety of code types by merely changing the display tape.

Another object of the present invention is to provide an indicator structure having only one contact which is subjected to the full value of motor cutoff current thereby reducing the probability of contact failure for a given period of operation.

Other objects, purposes and characteristic features of the present invention will be in part obvious from the accompanying drawings, and in part pointed out as the description of the invention progresses.

In describing the invention in detail, reference will be made to the accompanying drawings, in which like reference characters designate corresponding parts throughout the several views, and in which:

FIG. 1 illustrates a top view of a changeable indicator unit constructed in accordance with the present invention in which particular emphasis is directed to the method of supplying the (+) and (—) energy sources;

FIG. 2 illustrates a side sectional view taken on line 2—2 of FIG. 1 of the instant invention in which several of the elements including the contacts and the conductor wheels are more clearly shown;

FIG. 3 is an end sectional view taken on line 3—3 of FIG. 1 to show the structure of the contact strip and its associated conductor wheels in relation to the display tape and the printed circuit board included in a housing after the indicator has responded to energy provided on the control strips embedded in the printed circuit board in accordance with a particular code;

FIG. 4 is a diagrammatical view for a particular position of the display tape illustrating a control circuit for a changeable indicator employing the present invention with particular emphasis placed on the controlling operation of the indicator;

FIG. 5 is a code chart which shows ten display digits with each digit being associated with five control buses by having energy applied to three of the five control buses in a particular arrangement which constitutes a code;

FIG. 6 illustrates a display tape lying on its side which is perforated in accordance with the code allotted to each digit as shown in the code chart of FIG. 5;

FIG. 7 is an end view which shows the manner in which the individual digits would be displayed as well as the location of the perforation on either side of a given digit by the instant invention; and FIG. 8 is an enlarged view showing one conductor wheel in contact with its associated control strip which is made possible through a perforation in the display tape.

Referring to the accompanying drawings, it will be seen that the indicator unit has an outer shell 1 which has a wide base with extended sides. Into the base are recessed one end of a number of shafts such as shafts 13 and 14 disposed in a prearranged manner. A cover 2 is provided which has a wide base with short extended sides for enclosing the open side of shell 1, as best seen in FIG. 3. As shown, the base of cover 2 is wider than the base of shell 1 in order to allow the short extended sides of cover 2 to be contiguous to a portion of the extended sides of shell 1. The cover 2 has bores in its base disposed in such a manner as to be in accord with several of the shafts having one end recessed in shell 1. Snap rings 15 are provided to hold the shell 1 and the cover 2 together in conjunction with the several shafts to form a compact housing. The ends of the shafts which protrude from the base of cover 2 when cover 2 is placed in its intended position will individually receive a snap ring 15 to secure the intended position of cover 2. This can best be seen in FIG. 2.

From FIG. 1, it can be seen that the right-hand end of the housing has an opening which permits the viewing of a character of display related to the then existing position of the indicator elements. This opening has a transparent covering 9 which may be glass, plastic or the like, as is indicated in FIG. 7.

Also from FIG. 1, the left-hand end of the shell 1 has an opening from which protrudes a portion of a printed circuit board 21. The shell 1 and the cover 2 have bores 26 in appropriate locations, as shown in FIG. 2, to receive toothed portions of an insulating block 23. These toothed portions may be placed in their respective bores 26 when the indicator unit is assembled. As shown in FIG. 1, the block 23 is of sufficient width so as to rigidly hold the printed circuit board 21 tightly against the extended side of shell 1. To secure the opposite end of board 21 to this same extended side of shell 1, two screws 12 are provided. Appropriate size threads are provided in the board 21 to receive the threaded shafts of the screws 12 when assembled. The bores 33 provided in the extended side of shell 1 are shaped so as to receive the heads of screws 12 in a manner which will provide a flush surface, such as shown in FIGS. 1 and 3. The board 21 is thus supported for providing contact when the indicator unit is inserted into a position on a panel provided for such indicators.

On one side of the printed circuit board 21 are embedded five control strips 16 as shown in FIGS. 2 and 3 for providing controlling energy to the indicator unit in accordance with the code chart shown in FIG. 5. On the lower portion of this same side of board 21 are embedded two control strips 20 and 22 which respectively provide electrical paths for a (—) energy source and a (+) energy source to the indicator unit when it is inserted in a panel provided for such indicators. As may be seen in FIG. 2, these two control strips 20 and 22 are not of equal length. A portion 25 of the printed circuit board 21 is attached perpendicularly to one edge of the board 21. Embedded into this portion 25 are extensions of strips 20 and 22. It is thus convenient to make the two control strips 20 and 22 of unequal length so that the structure may be provided as described above.

In general, the indicator unit has a number of elements mounted along the base of shell 1 on several shafts as shown in FIG. 1. These elements include a motor M having a worm gear 4, a five-position Geneva escapement assembly 3 having a gear connected to the worm gear 4, a tape drum 5 having a gear which is operatively connected to a gear of the Geneva escapement assembly 3, a display tape 8 having ten characters of display inscribed on one side, roller guides 34 and 35 at the right-hand end of the indicator unit for providing a wide viewing angle of any character of display inscribed on the tape, a contact strip 6 connected to the motor M, spring-biased arms 7 extending from the contact strip 6 individually having a conductor wheel 17 connected to them and a pair of contacts 10 seated in an insulated holder 11 which is connected to the base of shell 1 by means of a rivet 31.

More specifically, the tape drum 5 has teeth 18 on its circumference located 120° apart. The distance covered by these 120° sectors is the length provided for a character of display on the display tape 8. The tape drum 5 is connected to a gear of the five-position Geneva escapement assembly 3 by a gear which is formed as part of the tape drum 5. The ratio of these gears is such that the Geneva escapement assembly 3 will operate through each of its five positions two times in order to display each character of the ten characters provided on the display tape 8 once. This ratio between the gear of the tape drum 5 and the gear of the Geneva escapement assembly 3 is thus five-to-three respectively which means further that the tape drum 5 will rotate 3⅓ revolutions while the Geneva escapement assembly 3 operates two times through each of its five positions. The tape drum 5 and the Geneva escapement assembly 3 may be manufactured molded parts where some material such as nylon suitable for providing efficient and durable gears is used.

A display tape 8 as shown in FIG. 6 in a flatwise position has ten digits ranging from 0 through 9. Provided between the digits and disposed in a vertical column are perforations which correspond to the codes allotted to display digits as shown in the code chart of FIG. 5. A plus (+) as used in the code chart shown in FIG. 5 represents energy which is supplied on a control bus CB while a zero (0) represents no energy supplied to a control bus CB. The two perforations in the display tape 8 for each digit are in accordance with the portion of the code which provides no energy on the control buses. Also in all of the columns of perforations, two perforations 19 are provided for engaging the toothed edges 18 provided on the tape drum 5. These perforations 19 may be conveniently termed drive holes and are used to prevent the display tape 8 from slipping as it rotates in the direction as indicated by the arrow shown in FIG. 6. In FIG. 6, these drive holes are shown in each column of perforations as being the top and bottom perforations. In order to utilize the tape 8 shown in FIG. 6, the free ends would be suitably cemented together so that the tape 8 would have the form of an endless tape with the inscribed digits being visible on the outside surface of the endless tape.

The structure shown in FIG. 1 in addition to the cover 2 viewed from the right-hand end would appear as shown in FIG. 7. As shown in FIG. 7, the digit 2 is displayed in the face of the indicator unit. To the right of the digit 2 in the display tape 8 are perforations which correspond to the digit 0. Also shown in this same column of perforations are two drive holes 19. To the left of the digit 2 in the display tape 8 are perforations which correspond to the digit 1. As before, the two drive holes 19 are shown at the top and bottom of the column of perforations. The perforations as stated correspond to those perforations located to the right and left of digit 2 respectively as shown in FIG. 6. Also shown in FIG. 7 is the transparent covering 9 which affords both protection for the tape 8 and a wide viewing angle of the digit displayed by the tape 8.

Connected to the base of shell 1 with rivets 38 is an insulated block 32. This block 32 has connected to it a contact strip 6 by means of rivets 39. With this structure, the block 32 provides insulation between the shell 1 and the strip 6 as well as support for the strip 6. The strip 6 has five spring biased arms 7 connected to it in a lateral manner by means of rivets 36. At the free end of each spring-biased arm 7, a wheel 17 of conducting material is attached in such a way that it may be rotated when driven by an external force. The display tape 8 is located between the five conductor wheels 17 and the printed circuit board 21, as can best be seen from FIG. 1. The association between the conductor wheel 17 and the display tape 8 is such that the wheels 17 will rotate with the rotation of the display tape 8 as shown by the arrows in FIGS. 1 and 6 which thus provides the driving external force. As the display tape 8 is rotated, the conductor wheels 17 will make contact at different times in accordance with the perforations in the tape 8 with their respective control strips 16 embedded within the printed circuit board 21 adjacent the other side of the display tape 8. This may be readily seen by referring to FIG. 3 where two conductor wheels 17 are shown in contact with their respective control strips 16 through the perforations provided in the display tape 8. As shown, the conductor wheels 17 are in accordance with those conductor wheels 17 shown in FIG. 4. According to the code chart of FIG. 5, the digit 2 should be displayed in the window of the indicator unit.

FIG. 8 has been provided to show more clearly by means of an enlarged view the way in which contact is made between a conductor wheel 17 and its respective control strip 16. As shown, the wheel 17 is making contact with its control strip 16 through a perforation in the display tape 8. This structure is typical of all contacts established between wheels 17 and their respective control strips 16.

The motor M may be of a suitable direct current type capable of providing the necessary actuation of the Geneva escapement assembly 3 and the tape drum 5 when energized by the necessary energy sources to cause the display tape 8 to be rotated in accordance with the control strip energization. Motors of this type are common to the commercial market and to those skilled in the art.

Several connections are made within the indicator unit between some of the disclosed elements. Referring to FIGS. 1 and 2, a wire 27 connects control strip 20 to one side of the motor M for providing an electrical path for a (−) energy source to the motor M. Wire 28 connects the control strip 22 to one contact of the pair of contacts 10 while the other contact of the pair of contacts 10 is connected to the opposite side of the motor M through wire 30. These connections provide an electrical path for a (+) to the motor M through the pair of contacts 10 at times in accordance with the position of the Geneva escapement assembly 3. Also connected to the opposite side of the motor M from the contact strip 6 is wire 29. This wire 29 provides an electrical path for (+) to the motor M in accordance with the energization of the control strips 16 and the conductor wheels 17.

The changeable indicator unit may be operated to any one of its ten positions by connecting the five control strips 16 to five control buses 1CB, 2CB, 3CB, 4CB and 5CB having a control circuit connected to it for each of the ten characters of display. Ten such control circuits may thus be provided as is shown in FIG. 4 where control push buttons 1CPB, 2CPB, 3CPB, 4CPB, 5CPB, 6CPB, 7CPB, 8CPB, 9CPB and 10CPB and a (+) energy source is provided for each character of display. When a push button CPB is depressed, energy is applied to three of the five control buses in accordance with the codes respectively allotted to each character of display shown in the code chart of FIG. 5. For example, consider the code allotted to the digit 2. In accordance with the code chart, (+) energy is required on control buses 2, 4 and 5. Referring now to FIG. 4, it may be seen that when push button 2CPB is depressed, (+) energy is applied through push button 2CPB onto control buses 2, 4 and 5.

The principle of operation of an indicator unit employing the present invention is that two controlling circuits will be provided for alternately energizing the motor M until one of the circuits is disconnected at the time it should be providing a controlling circuit for energizing the motor M. One such circuit would be provided when the conductor wheels 17 are rotating on the side of the display tape 8 between two successive columns of perforations. The other circuit would be provided when two of the conductor wheels 17 are making contact through the perforations in the display tape 8 with their respective control strips 16 embedded in the printed circuit board 21.

To better illustrate this principle, it is believed that the nature of the invention, its advantages and characteristic features can be best understood with further description being set forth from the standpoint of operation of the indicator structure shown.

Referring to FIGS. 3 and 4, two of the five conductor wheels 17 are shown making contact through perforations with their respective control strips 16. In this instance the control strips 16 are associated with control buses 1 and 3. By referring to the code chart shown in FIG. 5, it may be ascertained that the character displayed in the fact of the indicator is the digit 2. This is true since according to the code allotted to digit 2, no energy is or was applied to 1CB and 3CB. Assume now that the push button 7CPB is depressed. (+) is applied to control buses 1, 2 and 5. Since the conductor wheel 17 is making contact with its associated control strip 16 which is associated with bus 1CB, a complete circuit is provided to energize the motor M. As soon as the display tape 8 rotates to a position where the contact between the conductor wheel 17 and its associated contact strip 16 is open, (+) energy will be supplied through the contacts 10. These contacts 10 are closed since the portion of the Geneva escapement assembly 3 making contact with one of the contacts 10 is no longer making contact. This portion of the assembly 3 is indicated in FIG. 4. These contacts 10 will be opened when the display tape 8 rotates to the next position where two of the conductor wheels 17 are making contact with their respective control strips 16. Again, the energizing circuit is completed from (+) on 5CB since its associated conductor wheel 17 is in contact with its control strip 16. This cyclic operation continues until the conductor wheels 17 reach the perforations in the display tape 8 provided for the digit 7. Here, the conductor wheels 17 associated with buses 3CB and 4CB are making contact with their respective control strips 16. Since, according to the code chart of FIG. 5, (+) energy is not supplied on 3CB and 4CB, the energizing circuit for the motor M will be disconnected which further prevents the motor M from operating. At this time, the digit 7 is displayed in the face of the indicator unit.

Should it be desirable to construct a more compact operating panel of indicators employing the present invention where conservation of space or the digit size is most essential, several rearrangements of the elements disclosed could be effected during manufacture of the indicator which would be encompassed by the scope of the invention. A simple manner of expanding the size of each digit would only require inscribing each digit in an alternate fashion from that shown on the display tape 8 of FIG. 6. As shown, the columns of perforations are on either side of each digit. Inscribing each digit in the tape 8 so that the columns of perforations would be located at the top and bottom of each digit would afford larger sized digits. Also, an operating panel employing a given number of indicator units with tapes inscribed in the alternate fashion would have less width since the indicator units would be placed on their side, as is shown in FIG. 3. Another way of expanding the size of each digit while also providing a smaller indicator unit which rotates the display tape with increased speed would involve rearranging the elements within the cover 2 and the shell 1. The continuity of the elements would remain as is shown in the drawings. With reference to FIGS. 1, 2 and 3, it will be expedient to ascertain the necessary rearranging of the elements within the shell 1 and cover 2. This may be accomplished by imagining the entire structure within the shell 1 and cover 2 to be rotated ninety degrees in a clockwise direction while the shell 1 and cover 2 remain stationary. The dimensions of the shell 1 and cover 2 would preferably remain as is shown in the drawings while the dimensions of the elements would change correspondingly. The tape would be widened which could accommodate more code types. In lieu of the perforations corresponding to no energy provided on two out of five contact strips 16, they may likewise correspond to three out of six contact strips 16 or four out of seven contact strips 16 and so forth. The number of conductor wheels 17, contact strips 16 and other affected elements would necessarily be changed in accordance with the type of code desired.

Having thus described one form of a changeable indicator and its control circuits for use in an airway traffic control system as one specific embodiment of the present invention, it is to be understood that various modifications, adaptations and alterations may be applied to meet the requirements of practice without in any manner departing from the spirit or scope of the invention except as limited by the appended claims.

What I claim is:

1. A changeable display indicator unit comprising, in combination,
   (a) a housing having a plurality of terminal leads mounted for communicating exteriorly thereof with an external electrical source and having a plurality of walls including a display opening cut in one wall thereof, (b) an endless tape having a plurality of indicia spaced longitudinally on one face thereof and a plurality of selectively spaced perforations for each of said plurality of indicia, (c) a drum rotatably mounted in said housing remote from said display opening to frictionally engage a portion of the opposite face of said tape, (d) roller guides rotatably mounted in said housing adjacent said display opening to engageably support a portion of said opposite face of said tape to position a corresponding portion of said one face of said tape opposite to said display opening so as to display an indicium through said display opening, (e) a plurality of laterally spaced contact strips each electrically connected to one of said plurality of terminal leads and affixedly mounted in said housing between said one face of the tape and a second wall of said plurality of walls comprising the housing, (f) a plurality of spaced conductor arms affixedly connected at one end to a conductor supported by a third wall of said plurality positioned normal to said second wall and having their opposite ends biased in one direction against said opposite face of the tape to cause particular of said arms to engage particular of said contact strips when a plurality of perforations in said tape are positioned therebetween, (g) a D.C. motor, (h) a Geneva gear having two rotatably movable elements, one of said movable elements being driven by said motor, the other of said movable elements being driven intermittently by said one movable element during which time said drum is driven in one direction intermittently by said other movable element, (i) a first circuit means including said contact strips, said conductor arms and said supported conductor effective to energize said motor when particular of said conductor arms are in electrical engagement with selectively energized ones of said contact strips through particular of said perforations, (j) an electrical contact fixedly supported by said third wall in said housing apart from said conductor arm and normally biased to an electrically closed position during the intermittent driving of said other movable element, (k) said one movable element having a projection rotatable therewith and positioned at a predetermined location in its arcuate path to urge said contact to an electrically open position whereat particular of said conductor arms are in electrical engagement with particular of said contact strips while the intermittent driving of said other movable element is interrupted, (l) and a second circuit means effective to energize said motor through said electrical contact when said projection is without said predetermined location permitting said electrically closed position of said electrical contact to prevail.

2. A changeable display indicator unit according to claim 1, wherein each of said conductor arms includes a conductor wheel electrically connected and rotatably mounted on its said opposite end with each said wheel being biased against said tape to the extent that it is rotated according to the force exerted thereon by said tape when moving and adapted to protrude at least partially through a said perforation coming in the presence thereof, whereby each said conductor wheel electrically engages an associated one of said contact strips.

3. A changeable display indicator unit according to claim 2, wherein at least two of said conductor wheels are in electrical engagement with their associated said contact strips through corresponding perforations in said tape for each existing indication thereon, while the remaining said conductor wheels are each biased against the opposite face of said tape so as to exert only a minimum biasing force against said tape in each display position of said indicator unit.

4. A changeable display indicator unit according to claim 1, wherein the number of said indicia on said tape is ten with said drum being rotated three and one-third revolutions while said one movable element intermittently drives said other movable element for two complete revolutions when said motor is maintained energized for causing each of said ten indicia to be displayed by said indicator unit in said opening only once and in sequence.

References Cited in the file of this patent

UNITED STATES PATENTS

| | | |
|---|---|---|
| 2,723,391 | Hailey | Nov. 8, 1955 |
| 2,945,624 | Nicolaus | July 19, 1960 |
| 2,959,773 | March | Nov. 8, 1960 |

FOREIGN PATENTS

| | | |
|---|---|---|
| 432,447 | Great Britain | July 26, 1935 |
| 437,914 | Great Britain | Nov. 7, 1935 |